United States Patent [19]

Takeuchi et al.

[11] Patent Number: 4,858,133

[45] Date of Patent: Aug. 15, 1989

[54] DRIVE MANAGEMENT SYSTEM

[75] Inventors: Kunihiko Takeuchi, Kawasaki; Hajime Ikeda, Yokohama; Shinichi Horinouchi, Tokyo, all of Japan

[73] Assignee: Tokyo Keiki Company Ltd., Tokyo, Japan

[21] Appl. No.: 168,254

[22] Filed: Mar. 15, 1988

[30] Foreign Application Priority Data

Mar. 20, 1987 [JP] Japan .............................. 62-671138

[51] Int. Cl.[4] ........................ G06F 3/08; G06F 15/74

[52] U.S. Cl. .............................. 364/424.04; 340/459

[58] Field of Search ................ 340/52 F; 364/424.01, 364/424.03, 424.04

[56] References Cited

U.S. PATENT DOCUMENTS 4,067,061 1/1978 Juhasz .......................... 340/52 F X 4,258,421 3/1981 Juhasz et al. ................ 340/52 F X 4,307,455 12/1981 Juhasz et al. ........................ 364/900

*Primary Examiner*—David Mis

*Attorney, Agent, or Firm*—Wenderoth, Lind & Ponack

[57] ABSTRACT

Drive data such as vehicle velocity, engine rotational speed, and the like are recorded into a memory module in a state in which the memory module is attached to a vehicle. When drive management data is made, the memory module is detached from the vehicle and set to a read unit. When the read unit reads out the drive data recorded in the memory module, the drive management data such as drive period of time, rest period of time, maximum drive speed, drive distance, and the like are calculated on the basis of the readout data. The drive records classified every driver or every vehicle are automatically made.

6 Claims, 5 Drawing Sheets

FIG.2

| ADDRESS | 8 BIT DATA | CONTENT | TIME |
|---|---|---|---|
| A 0 | 0 0 | DRIVER'S ID | NO |
| A 1 | 0 1 | | |
| A 2 | 0 0 | 0 rpm | 12:57 |
| A 3 | 0 0 | 0 Km / h | |
| A 4 | 2 7 | 2700 rpm | 12:58 |
| A 5 | 5 2 | 52 Km / h | |
| A 6 | 1 5 | 1500 rpm | 12:59 |
| A 7 | 3 5 | 35 Km / h | |
| A 8 | ※ | TIME MARK | |
| A 9 | 1 9 | 1 9 8 7 | |
| A 10 | 0 3 | | |
| A 11 | 1 2 | MARCH 12 | |
| A 12 | 1 3 | 13:00 | |
| A 13 | 3 0 | 3000 rpm | 13:00 |
| A 14 | 5 5 | 55 Km / h | |

DRIVE MANAGEMENT SYSTEM

BACKGROUND OF THE INVENTION

The present invention relates to a drive management system to automatically make drive management data of vehicles for use in business and, more particularly, to a drive management system in which a memory module to record drive information is attached to a vehicle, and by removing the memory module from the vehicle and setting to an apparatus, drive management system is automatically made.

Hitherto, in a drive recording instrument attached to a vehicle, a disk-shaped recording paper is rotated at a constant speed by a motor whose rotational speed is reduced by gears, and the data necessary for the drive management is recorded by a pen recorder which oscillates in the radial direction. Namely, in the conventional drive recording instrument, the speed or the like is recorded by the pen recorder along the time base in the circumferential direction of the recording paper.

Therefore, to make a drive management table, the recording papers are collected from the vehicles when such a table is needed for management, and the data necessary to manage drive periods of time, rest periods of time, and the like of the drivers are collected from these recording papers.

However, in the conventional drive management, since the drive recording instrument records the drive data onto the recording paper by using a pen, the accuracy and resolution of the recording data are very low. On the other hand, the data necessary for management are sequentially read out by the eyes from the graph data written on the recording paper and the drive management tables are formed every driver and every vehicle. Thus, there is a problem such that the working efficiency is extremely low.

SUMMARY OF THE INVENTION

It is an object of the present invention to provide a drive management system in which there is no need to manually read out drive data and a drive management table can be automatically formed.

Another object of the invention is to provide a drive management system in which a memory module to record drive data as numerical values is attached to a vehicle, and by removing the memory module from the vehicle and setting to an apparatus, a drive management table can be automatically formed.

Still another object of the invention is to provide a drive management system in which recording data in the memory module is read out by a contactless coupling method using induction coils.

Still another object of the invention is to provide a drive management system in which drive management data such as drive period of time, rest period of time, maximum drive velocity, drive distance, and the like are calculated and obtained from the recording data in the memory module.

Still another object of the invention is to provide a drive management system for making classified drive management data every driver and every vehicle.

That is, according to the invention, there is provided a memory module having therein a recording medium in which predetermined drive data is stored as numerical values in the state in which the memory module is attached to a vehicle. When making the drive recording data, the memory module is detached from the vehicle and set to a read unit, thereby reading out the stored data from the memory module. On the basis of the drive data read out of the memory module by the read unit, a management data making unit calculates the drive management data such as drive period of time, rest period of time, maximum drive velocity, drive distance, and the like, thereby forming the classified drive recording data every driver and/or every vehicle.

For these objects, in the drive management system of the invention, when necessary for management, the memory modules are collected from the vehicles and set to the read unit, so that the drive data recorded in the memory module are read out and the drive management data such as drive period of time, rest period of time, maximum drive velocity, drive distance, and the like are calculated every driver and every vehicle. A drive management table can be printed out by a printer or the like. Consequently, the drive management works of the vehicles can be fairly efficiently performed.

The above and other objects, features, and advantages of the present invention will become more apparent from the following detailed description in conjunction with the accompanying drawings.

BRIEF DESCRIPTION OF THE DRAWINGS

FIG. 2 is an explanatory diagram showing an example of drive recording data recorded in a memory module;

DETAILED DESCRIPTION OF THE PREFERRED EMBODIMENTS

Figure 1:
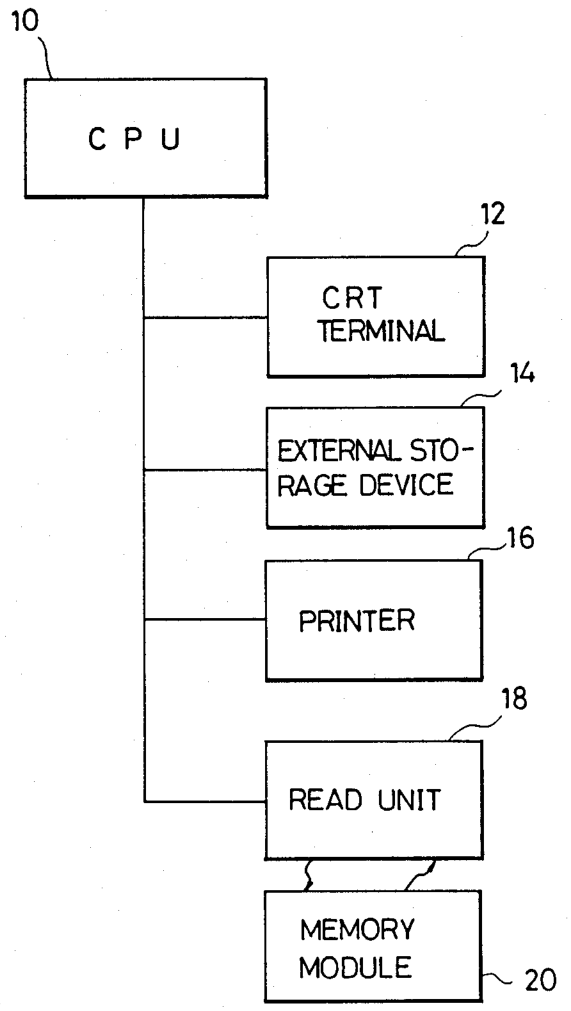
FIG. 1 is a system block diagram showing an embodiment of the present invention.

In FIG. 1, a CPU 10 calculates drive management data such as drive period of time, rest period of time of a driver, maximum drive velocity, drive distance, and the like necessary for drive management on the basis of drive recording data collected from each vehicle. A CRT terminal 12 has a CRT and a keyboard and instructs the CPU 10 to make drive management data based on the drive recording data collected and to execute the arithmetic operations which are necessary for a display process. An external storage device 14 consists of a recording medium such as magnetic disk, floppy disk, magnetic tape, or the like and records and holds in the recording medium the drive recording data collected by the CPU 10 and the drive management data calculated. For this purpose, the external storage device 14 has a memory capacity enough to store data of many vehicles and drivers.

A printer 16 prints out the drive recording data collected by the CPU 10 and the calculated drive management data necessary for management, thereby making a drive management table.

A read unit 18 is further provided. The read unit 18 reads the drive recording data of vehicles which are necessary to calculate the drive management data by the CPU 10. A memory module 20 is set into the read unit 18. The memory module 20 is attached to a vehicle and in this state, the drive data such as vehicle velocity, engine rotational speed, and the like are stored into the memory module 20. When the drive management data is made, the memory module 20 is detached from the vehicle and set to the reading position in the read unit 18.

Further, the drive data is read out of the memory module 20 by the read unit 18 by a contactless coupling method using induction coils as will be explained hereinlater. An operating power source is supplied from the read unit 18 to the memory module 20 in a contactless coupling manner by using the induction coils and at the same time, the bidirectional data transmission is also performed to read out the drive data from the memory module 20.

The read unit 18 and memory module 20 can be also coupled by using electrical contact members instead of the contactless coupling method.

The operation of the embodiment of FIG. 1 will now be described.

FIG. 2 is an explanatory diagram showing an example of drive data which is recorded into the memory module 20 in the state in which it is attached to a vehicle.

In FIG. 2, in one memory data, one byte consists of eight bits. First, the ID number of a driver to identify the driver is stored in a head address $A_0$ and the next address $A_1$. To identify a vehicle, the ID number of the vehicle is stored. The engine rotational speed and the vehicle velocity data are detected every minute and stored into address $A_2$ and subsequent addresses. For example, assuming that "00" is set to addresses $A_2$ and $A_3$, this means that the engine rotational speed is 0 r.p.m. and the vehicle velocity is 0 km/h. At this time, the vehicle is stopped.

The engine rotational speed of 2700 r.p.m. and the vehicle velocity of 52 km/h at time 12:58 are stored into addresses $A_4$ and $A_5$ as numerical value data of "27" and "52". It will be understood that the vehicle starts running at this time point.

A time mark "*" is stored into address $A_8$. Since this time mark indicates the time 13:00, the date data consisting of year (1987), month (03), and day (12) and the time data (13:00) are stored into addresses $A_9$ to $A_{12}$. The engine rotational speed and vehicle velocity at time 13:00 are stored into addresses $A_{13}$ and $A_{14}$. In a manner similar to the above, the engine rotational speed and vehicle velocity are stored every minute.

In this way, the drive data shown in FIG. 2 is stored into the memory module 20. When the memory module 20 is set to the read unit 18, the memory module 20 is supplied with a power source from the read unit 18 and is made operative. Subsequently, the memory module 20 receives a read control (read command and designation of a read address) from the read unit 18, so that the drive data stored in the memory module 20 is read out by the read unit 18 and transmitted from the read unit 18 to the CPU 10.

When the CPU 10 receives the drive data in the memory module 20 from the read unit 18, the CPU 10 makes the drive management data on the basis of this drive data.

For example, the CPU 10 first reads out the ID number of the driver and identifies the driver whose data is to be made and then displays and stores the driver's name. Next, the CPU 10 searches the time mark, that is, the head position of the date and time written every hour. For example, assuming that the CPU 10 searched the time mark (in address $A_8$) in the drive recording data of FIG. 2, the date of Mar. 17, 1987 and the time of 13:00 are discriminated from the contents of the subsequent addresses $A_9$ to $A_{12}$. Thus, the data in addresses $A_2$ and $A_3$ at the start of the recording is the recording data obtained three minutes before that time point, i.e., 12:57, Mar. 12, 1987. It is determined that the recording was started from this time point. The recording start time point is displayed and stored.

Next, the CPU 10 successively searches only the velocity data from the head position of the data. The drive period of time is calculated by counting the number of vehicle velocity data other than the velocity of 0 km/h. On the other hand, the rest period of time is calculated by counting the number of velocity data of 0 km/h. However, in the case of counting the number of velocity data of 0 km/h, not only the actual rest period of time but also the stop period of time of the vehicle due to the temporary stop by the red light indicative of "STOP", traffic jam, and the like are counted. To avoid such a miscounting, for example, only the portion of ten minutes or longer, that is, the portion where ten or more velocity data of 0 km/h continue is determined to be the rest period of time. Consequently, the rest period of time having almost no error can be calculated.

Then, the CPU 10 sequentially searches the engine rotational speed. On the basis of the engine rotational speed searched, the time when the ratio (N/V) of the engine rotational speed N to the velocity V exceeds a predetermined value (almost the same value is set for the one-speed and two-speed gear ratios) is counted. When the ratio of the engine rotational speed to the vehicle velocity exceeds a predetermined value, the vehicle is in a driving state under the conditions of down slope, traffic jam region, narrow road, or the like in which careful attentions are required for the driver and the driver feels much fatigues in driving the car. Therefore, the drive period of time when the drive fatigue is high is calculated from the time point when the ratio of the engine rotational speed to the vehicle velocity exceeds a predetermined value. This drive period of time is displayed and recorded.

On the contrary, if the vehicle velocity is continuously held to a high predetermined value of, e.g., 70 km/h or more for a long time, this means that the driver has been continuously driving without taking a rest such as in the driving on a freeway or the like. On the basis of the calculated value of the drive period of time exceeding the predetermined velocity, discriminating data to see if it is proper or not to instruct the driver to take a rest can be displayed and recorded.

Further, by detecting the maximum velocity from the searched velocity data, it is also possible to discriminate whether the maximum velocity exceeds the legal velocity or not.

Figure 3:
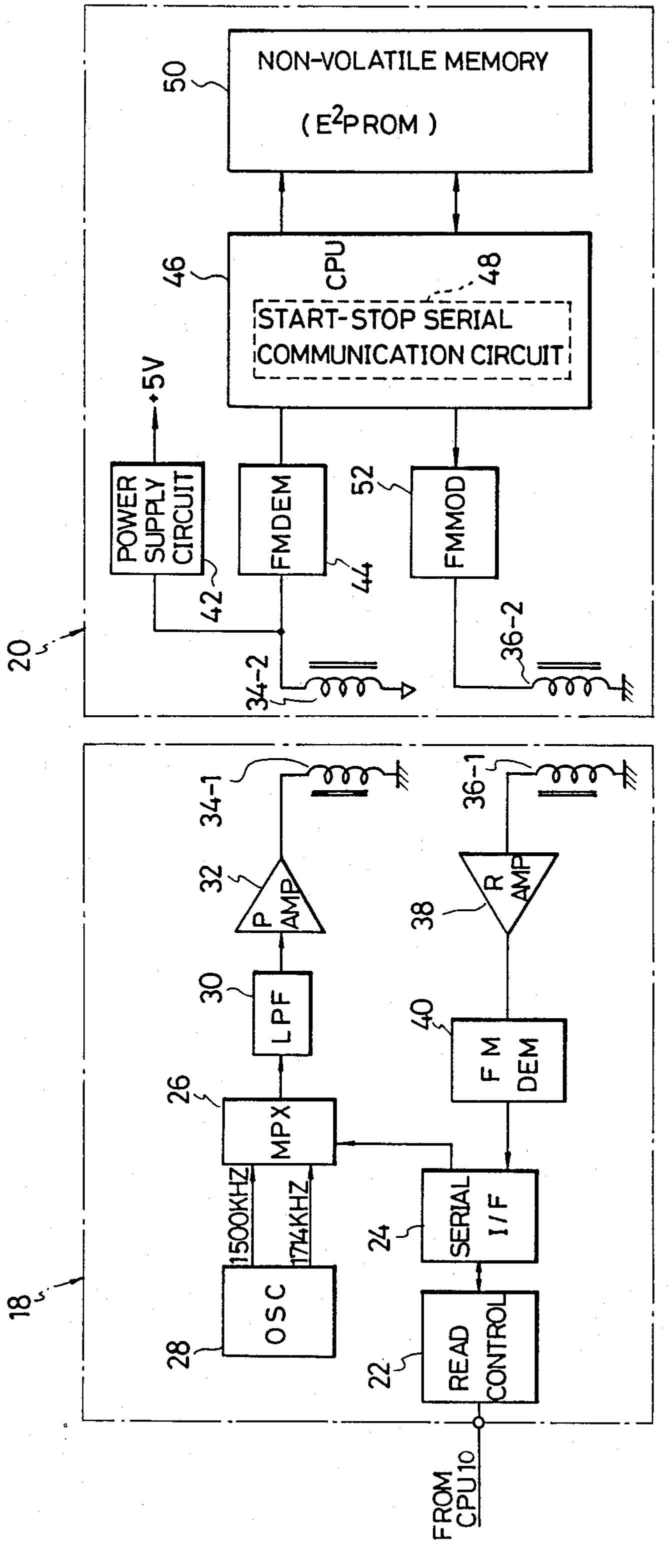
FIG. 3 is a circuit block diagram showing an embodiment of a read unit and a memory module in FIG. 1.

FIG. 3 is a circuit block diagram showing an embodiment of the read unit 18 and memory module 20 in FIG. 1.

In FIG. 3, the read unit 18 has a read control unit 22 using a CPU to control the reading operation of data.

The read control unit 22 is connected to the CPU 10 in FIG. 1.

An input/output port for the memory module 20 of the read control unit 22 is connected to a serial interface 24. The serial interface 24 converts the parallel data from the read control unit 22 to the serial data and converts the serial data from the memory module 20 to the parallel data.

The read data (read command and read address) transmitted from the read control unit 22 through the serial interface 24 is used as a switching signal of a multiplexer 26. Clock frequency signals of 1500 kHz and 1714 kHz are given to the multiplexer 26 from an oscillator 28. When a data bit "1" is input to the multiplexer 26 from the serial interface 24, the multiplexer 26 select the clock frequency signal of 1714 kHz from the oscillator 28 and outputs. On the other hand, when a data bit "0" is input from the serial interface 24, the multiplexer 26 selects the clock frequency signal of 1500 kHz and outputs. Therefore, the multiplexer 26 and oscillator 28 constitute frequency modulating means for converting the serial data into two different frequency signals corresponding to the data bits "1" and "0".

The frequency signal of 1714 kHz or 1500 kHz selected by the multiplexer 26 is given to a low pass filter (LPF) 30 and converted into the sine wave signal. The frequency signal converted into the size wave by the low pass filter 30 is amplified by a power amplifier 32 and supplied to an induction coil 34-1 for transmission.

An induction coil 36-1 for reception is provided to receive the signal from the memory module 20. The frequency signal obtained by the induction coil 36-1 is amplified by a high frequency amplifier 38 and supplied to a frequency demodulator 40.

The frequency signal of 1865 kHz corresponding to the data bit "1" or the frequency signal of the frequency 0 corresponding to the data bit "0" is sent from the memory module 20. Therefore, when the frequency demodulator 40 receives the frequency signal of 1865 kHz, the demodulator 40 converts it into the data bit "1" and outputs. On the other hand, when the frequency signal of the frequency 0 is input, the demodulator 40 converts it into the data bit "0" and outputs. This serial data is converted into the parallel data by the serial interface 24 and input to the read control unit 22. Practically speaking, the frequency demodulator 40 to convert the frequency signal to the data bit is constituted by a band pass filter whose center frequency is 1860 kHz and whose band width is ±50 kHz and a detecting circuit using a diode to detect an output of the band pass filter. The frequency demodulator 40 further has a comparator to waveform shape a detection output.

The memory module 20 will now be described. The memory module 20 has an induction coil 34-2 to receive a power source and a signal. The induction coil 34-2 is arranged so as to face the induction coil 34-1 of the read unit 18. A frequency modulation signal consisting of a combination of the frequency signals of 1500 kHz and 1714 kHz is induced in the induction coil 34-2 by electromagnetic induction coupling. An output of the induction coil 34-2 is given to a power supply circuit 42. The power supply circuit 42 rectifies the frequency signal consisting of the combination of 1500 kHz and 1714 kHz, thereby producing a power source voltage of ±5 V which is used in the circuits in the memory module 20. The output of the induction coil 34-2 is also given to a frequency demodulator 44. The frequency demodulator 44 converts the two signal frequencies into the data bits "1" and "0". Practically speaking, the frequency demodulator 44 comprises a band pass filter whose center frequency is 1714 kHz and whose pass band width is ±50 kHz and a detecting circuit using a pin diode and the like to detect an output of the band pass filter. When the frequency signal of 1714 kHz is input, the frequency demodulator 44 outputs the data bit "1". In the other case, namely, when the frequency signal of 1500 kHz is input, the frequency demodulator 44 outputs the data bit "0".

The bit data demodulated by the frequency demodulator 44 is supplied to a CPU 46. As shown by a broken line, the CPU 46 has a start-stop serial communication circuit 48 and performs the serial data transmission while keeping the signal synchronization with the read unit 18 by the start-stop method. One-chip type is used as the CPU 46. An ROM and an RAM are assembled in the same chip.

A non-volatile memory 50 to store data is connected to the CPU 46. As the non-volatile memory 50, for example, an EEPROM (electrically erasable and programmable ROM) whose data can be electrically rewritten by an external signal is used. Further, it is desirable to use a CMOS type EEPROM to reduce an electric power consumption. A read address or write address in the memory 50 is designated by the CPU 46 and data is read out from or written into the designated address in the memory 50.

The data read out of the memory 50 by the CPU 46 is converted into the serial data under the control by the start-stop serial communication circuit 48 and given to a frequency modulator 52. When the data bit "1" is input from the CPU 46, the frequency modulator 52 outputs the frequency signal of 1865 kHz. When the data bit "0" is input, the frequency modulator 52 stops the output of the frequency signal. Practically speaking, the frequency modulator 52 comprises an oscillator having an oscillating frequency of 1865 kHz and an AND gate to get the AND of an oscillating output and the data bit from the CPU 46. Thus, with respect to the read data, the data bit "1" is set to the frequency signal of 1865 kHz and the data bit "0" is set to the signal of the frequency 0. An output of the frequency modulator 52 is supplied to an induction coil 36-2. The induction coil 36-2 is arranged so as to face the induction coil 36-1 of the read unit 18. The frequency signal is induced in the induction coil 36-1 by the magnetic field generated from the induction coil 36-2, thereby transmitting the read data from the non-volatile memory 50 to the read unit 18.

In the reading operation of data from the memory module 20, prior to sending a reading request to the memory module 20, a confirmation signal is first sent. The state of the electromagnetic coupling of the induction coils is discriminated by checking the presence or absence of a confirmation response signal from the memory module 20. After the normal confirmation response was obtained, the data reading operation is started. Further, the read control unit 22 checks whether errors are included in the read data which was sent on, e.g., a 32-byte unit basis. If errors are detected, a retransmission request is sent to the memory module 20. If errors are detected even after the retransmission request was sent the designated number of times, error data is informed to the CPU 10 in FIG. 1.

On the other hand, as a drive recording apparatus which is attached to a vehicle in order to record the drive data into the memory module 20, it is possible to use the same unit as the read unit 18 or a write-only type unit which is obtained by excluding the induction coil 36-1, high frequency amplifier 38, and frequency demodulator 40 from the read unit 18.

Figure 4:
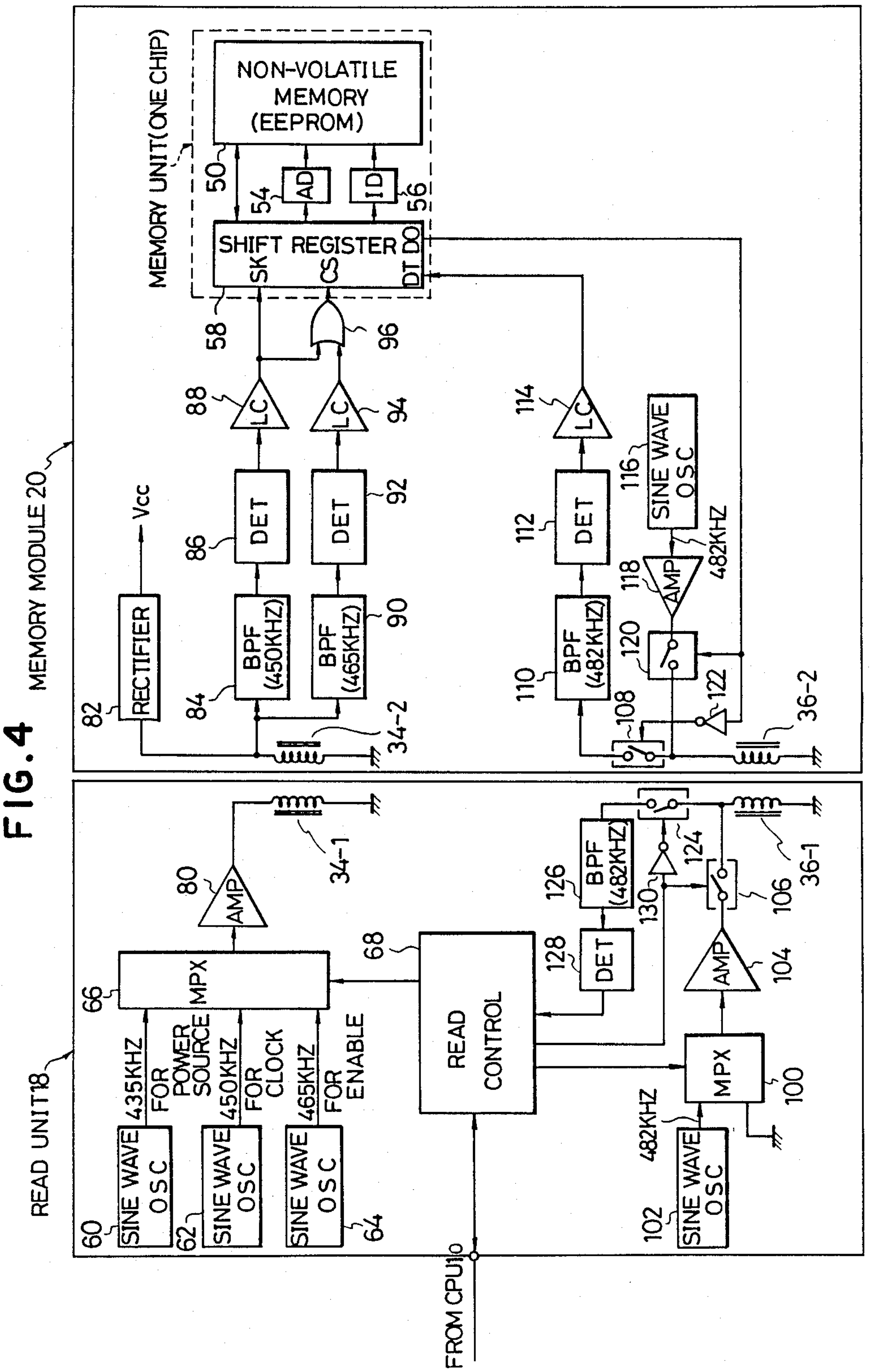
FIG. 4 is a circuit block diagram showing another embodiment of the read unit and memory module in FIG. 1.

FIG. 4 is a circuit block diagram showing another embodiment of the read unit 18 and memory module 20 in FIG. 1. Although the start-stop serial communication system has been used in FIG. 3, a sync clock communication system is used in FIG. 4.

The read unit 18 has the induction coil 34-1 to send an operating electric power and a sync clock to the memory module 20 and the induction coil 36-1 to perform the bidirectional transmission of the read information with the memory module 20. The induction coil 36-2 of the memory module 20 is arranged so as to face the induction coil 36-1 through a predetermined gap. The operating electric power and sync clock can be transmitted from the read unit 18 to the memory module 20 by the contactless induction coppling by using the induction coils 34-1 and 34-2. On the other hand, by the contactless induction coupling by using the induction coil 34-1 of the read unit 18 and the induction coil 34-2 of the memory module 20, the read command and read address can be transmitted from the read unit 18 to the memory module 20 and the read data from the memory module can be bidirectionally transmitted.

The memory module 20 has therein the non-volatile memory 50 consisting of the EEPROM. The memory 50 uses a memory unit having a shift register 58 in the same chip. The write data which is serially transmitted from the outside is converted into the parallel data by the shift register 58. The parallel data read out of the memory 50 is converted into the serial data by the shift register 58. Then, the shift register 58 outputs the converted data. As the memory unit, it is also possible to use an EEPROM with the communicating function such as NMC 9306 made by National Semiconductor Co., Ltd., X2404 made by Xicor Co., Ltd., or the like.

For example, in the case of using NMC 9306 made by National Semiconductor Co., Ltd. as the memory unit provided in the memory 50, the shift register 58 has a shift clock terminal SK, a chip selection terminal (enable terminal) CS, a serial data input terminal DI, and a serial data output terminal DO. By supplying a shift clock to the shift clock terminal SK in the enable state in which the chip selection terminal CS of the shift register 58 is set to the H level, the serial data which is given to the serial data input terminal DI is read synchronously with the shift clock and converted into the parallel data, so that the writing and reading control for the memory 50 can be performed. On the other hand, an instruction decoder 56 to decode a write/read command and an address decoder 54 to designate a write/-read address are arranged between the shift register 58 and the memory 50.

Figure 5:
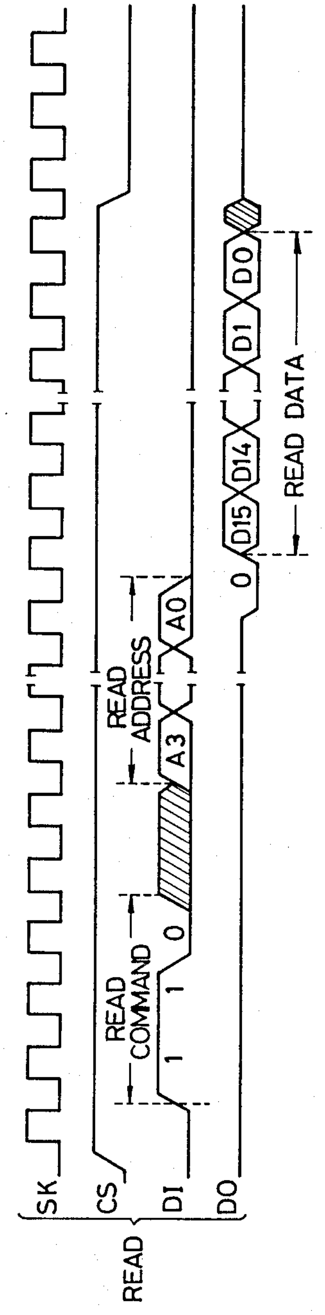
FIG. 5 is a timing chart showing the read control for the memory module in FIG. 4.

FIG. 5 is a timing chart showing the reading control for the memory 50 by the shift register 58 in FIG. 4.

In the reading control, by setting the chip selection terminal CS to the H level by supplying a shift clock to the shift clock terminal SK, the enable state is obtained in which data can be read out from the serial data input terminal DI. In this state, by giving a read command "110" of three bits and arbitrary read addresses "$A_3$, $A_2$, $A_1$, $A_0$" consisting of four bits to the serial data input terminal DI, each bit of the read command and read addresses is converted into the parallel data synchronously with the shift clock SK. The read command is interpreted by the instruction decoder 56 and the reading mode is set to the memory 50. The read addresses are decoded by the address decoder 54 and the read addresses are designated in the memory 50. When the read command and read addresses converted into the parallel data by the shift register 58 are given to the memory 50, the memory 50 reads out the read data of 16 bits from the designated addresses and transfers to the shift register 58. On the basis of the read data received, the shift register 58 sequentially converts the read data into the serial data in accordance with the order from $D_{15}$ to $D_0$ synchronously with the shift clocks SK and outputs from the serial data output terminal DO.

In the read unit 18 for the memory module 20 having therein the memory unit to perform the reading control as shown in FIG. 5, the shift clock, chip selection signal (enable signal), and operating electric power need to be supplied to the shift register 58 in the memory unit of the memory module 20. Therefore, the read unit 18 has: a sine wave oscillator 60 to oscillate a sine wave signal of 435 kHz to supply the operating electric power; a sine wave oscillator 62 to oscillate a sine wave signal of 450 kHz for shift clocks; and a sine wave oscillator 64 to oscillate a sine wave signal of 465 kHz to enable. Outputs of the sine wave oscillators 60, 62, and 64 are input to a multiplexer 66. The multiplexer 66 selects either one of the sine wave signals on the basis of a control signal from a read control unit 68 using a CPU and supplies to the induction coil 34-1 for up-signal transmission through an amplifier 80.

Upon reception of the read command from the CPU 10 in FIG. 1, the read control unit 68 starts the reading control. Prior to executing the reading control, in order to set the memory module 20 to the standby state, the frequency signal of 435 kHz from the sine wave oscillator 60 is first selected and supplied to the induction coil 34-1 through the amplifier 80.

On the other hand, when the reading control is started, the read control unit 68 allows the multiplexer 66 to select the frequency signal of 450 kHz for clocks when the sync clock is set to "1" to serially transmit the read command and read addresses. The selected frequency signal is supplied to the induction coil 34-1 through the amplifier 80. When the sync clock is set to "0", the read control unit 68 allows the multiplexer 66 to select the frequency signal of 465 kHz to enable. This frequency signal is supplied to the induction coil 34-1. In this manner, such switching operations are alternately repeated.

In other words, the multiplexer 66 modulates the bit "1" of the sync clock for transmission and reception which is given from the read control unit 68 by the frequency signal of 450 kHz. The multiplexer 66 modulates the bit "0" of the sync clock by the frequency signal of 465 kHz. Further, when no sync clock is obtained, the multiplexer 66 supplies the power frequency signal of 435 kHz to the induction coil 34-1.

In correspondence to the frequency signal which was time-sharingly multiplexed after it was modulated by the frequency signals for power source, clocks, and enable which are supplied to the induction coil 34-1 of the read unit 18, the memory module 20 has means for demodulating the operating power source, shift clocks, and chip selection signal to enable from the frequency modulation signal induced in the induction coil 34-2 by the induction coupling.

First, the output of the induction coil 34-2 is given to a rectifier 82. The rectifier 82 rectifies all of the frequency modulation signals induced in the induction coil 34-2 and supplies a power source voltage $+V_{cc}$ to each circuit section in the memory module 20.

The output of the induction coil 34-2 is input to a band pass filter 84 to take out the frequency modulation signal of 450 kHz for clocks. The band pass filter 84 has a center frequency of 450 kHz and a pass band width of ±2 to 2.5 kHz for the center frequency. Therefore, only the frequency modulation signal of 450 kHz for clocks is taken out from three frequency signals of 435, 450, and 465 kHz. An output of the band pass filter 84 is supplied to a detecting circuit 86. Shift clocks are demodulated from the frequency modulation signal of 450 kHz by the detecting circuit 86. Further, the shift clock signal is waveform shaped to a square wave signal by a waveform shaping circuit 88. The demodulated shift clocks are supplied to the shift clock terminal SK of the shift register 58 in the memory unit.

An output of the induction coil 34-2 is input to a band pass filter 90 to take out the frequency modulation signal of 465 kHz to enable. The band pass filter 90 has a center frequency of 465 kHz and a pass band width of ±2 to 2.5 kHz for the center frequency. Thus, only the frequency modulation signal of 465 kHz to enable is taken out from the three frequency modulation signals of 435, 450, and 465 kHz which are induced in the induction coil 18. An output of the band pass filter 90 is input to a detecting circuit 92. A clock signal to enable (inverted signal of the shift clock) is demodulated from the frequency modulation signal of 465 kHz by the detecting circuit 92. This clock signal is waveform shaped by a waveform shaping circuit 94 and thereafter, it is input to one input terminal of an OR gate 96. The shift clock from the waveform shaping circuit 88 is supplied to the other input terminal of the OR gate 96. By getting the OR of the shift clock and enable clock by the OR gate 96, the enable signal is given to the chip selection terminal CS of the shift register 58.

Figure 6A:
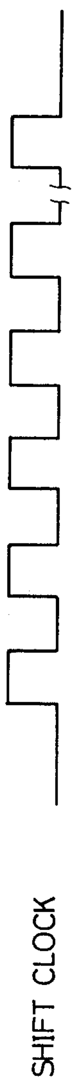
FIG. 6A is an explanatory diagram of a shift clock signal which is supplied to the memory module in FIG. 4.
Figure 6B:
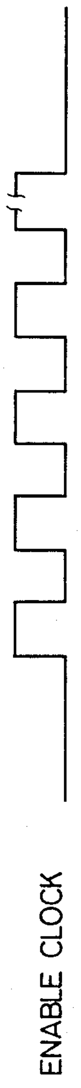
FIG. 6B is an explanatory diagram of an enable clock signal which is supplied to the memory module in FIG. 4.
Figure 6C:
FIG. 6C is an explanatory diagram of an enable signal which is formed in the memory module in FIG. 4.

Namely, since the shift clock shown in FIG. 6A and the enable clock shown in FIG. 6B are input to the OR gate 96, by getting the OR of them, the enable signal which is supplied to the chip selection terminal CS shown in FIG. 6C can be made.

Therefore, with respect to the reading mode of the memory module 20, the multiplexer 66 provided in the read unit 18 selects the frequency signal of 450 kHz for clocks in response to the bit "1" of the sync clock generated from the read control unit 68. On the other hand, the multiplexer 66 selects the frequency signal of 465 kHz to enable in response to the bit "0" of the sync clock. Thus, when the enable clock is obtained, the OR gate 96 of the memory module 20 can make the enable state to read out by setting the chip selection terminal CS to the H level.

The transmission of the read command and read addresses which is performed from the read unit 18 to the memory module 20 will now be described.

First, the read unit 18 has a multiplexer 100 for serially converting the read command and read addresses by internal clocks and for converting the bit data which is output from the read control unit 68 into the frequency signal. A sine wave oscillator 102 to oscillate the frequency signal of 482 kHz indicative of the data bit "1" is connected to one input terminal of the multiplexer 100. The other input terminal of the multiplexer 100 is grounded to give a signal of a frequency 0 indicative of the data bit "0". Therefore, upon reception of the data bit "1" from the read control unit 68, the multiplexer 100 outputs the frequency signal of 482 kHz. On the other hand, when the data bit "0"is input, the multiplexer 100 outputs the signal of a frequency 0.

Namely, the multiplexer 100 represents the data bits "1" and "0" in dependence on the presence and absence of the frequency signal of 482 kHz.

An output of the multiplexer 100 is connected to the induction coil 36-1 through an amplifier 104 and an analog switch 106. The frequency modulation signal of the data bit supplied to the induction coil 36-1 induces the frequency modulation signal in the induction coil 36-2 of the memory module 20 which is separately arranged so as to face the induction coil 36-1 through a predetermined gap.

The frequency modulation signal induced in the induction coil 36-2 of the memory module 20 is input to a band pass filter 110 through an analog switch 108. The band pass filter 110 has a center frequency of 482 kHz and a pass band width of ±2 to 2.5 kHz for the center frequency. Therefore, only the frequency modulation signal of 482 kHz induced in the induction coil 36-2 is taken out. An output of the band pass filter 110 is given to a detecting circuit 112. The data bits are demodulated from the frequency modulation signal of 482 kHz by the detecting circuit 112. This signal is further waveform shaped into the square wave signal by a waveform shaping circuit 114. Thereafter, the demodulated bit data is input to the serial data input terminal DI of the shift register 58 in the memory unit.

On the other hand, in order to return the serial bit data (read data) transmitted from the serial data output terminal DO of the shift register 58 to the read unit 18, a sine wave oscillator 116 to oscillate the sine wave signal of 482 kHz to frequency modulate the bit data is provided. An output of the sine wave oscillator 116 is connected to the induction coil 36-2 through an amplifier 118 and an analog switch 120. The analog switch 120 is turned on or off in accordance with the bit data obtained from the serial data output terminal DO of the shift register 58. Namely, when the data bit is set to "1", the analog switch 120 is turned on, so that the sine wave signal of 482 kHz is supplied to the induction coil 36-2. When the data bit is set to "0", the analog switch 120 is turned off, thereby stopping the supply of the sine wave signal of 482 kHz to the induction coil 36-2. Due to the on/off control of the analog switch 120 responsive to the serial data bit, the serial bit data obtained from the serial data output terminal DO of the shift register 58 is converted into the frequency signal of 482 kHz in response to the bit "1". The serial bit data is converted into the signal of the frequency 0 in response to the bit "0".

On the other hand, the analog switch 108 to connect the output of the induction coil 36-2 to the band pass filter 110 is turned on or of by the signal obtained by inverting the output of the serial data output terminal DO of the shift register 58 by an inverter 122. In other words, when the serial bit data of the read data is not output from the serial data output terminal DO, an output of the inverter 122 is set to the H level. Thus, the analog switch 108 is turned on. When the bit "1" of the read data is output from the serial data output terminal DO, the output of the inverter 122 is set to the L level, so that the analog switch 108 is turned off.

To receive the serial transmission of the read data which was frequency modulated by the on/off control of the analog switch 120 in the memory module 20, the output of the induction coil 36-1 of the read unit 18 is connected to a band pass filter 126 through an analog switch 124. The band pass filter 126 has a center frequency of 482 kHz and a pass band width of ±2 to 2.5 kHz for the center frequency. The frequency modulation signal from the memory module 20 induced in the induction coil 36-1 when the analog switch 124 is turned on is taken out. The data bits are demodulated by a detecting circuit 128. The serial bit data of the read data is sent to the read control unit 68.

The analog switches 106 and 124 to selectively connect the induction coil 36-1 are turned on or off by a control signal from the read control unit 68. Since the control signal of the analog switch 124 has already been inverted by an inverter 130, when the analog switch 106 is turned on, the analog switch 124 is certainly turned off. On the contrary, when the analog switch 106 is turned off, the analog switch 124 is turned on. When the read command and read addresses are sent to the memory module 20, the analog switch 106 is turned on. On the other hand, the analog switch 124 is turned on when the read data which is transmitted from the memory module 20 after the read command and read addresses were transmitted is received.

According to the embodiment of FIG. 4, as compared with the start-stop communication system, in the transmission of the sync clock for transmission and reception, the reliability of the serial data transmission is high and it is hardly necessary to check errors. Therefore, the communication control is simplified and the transmission processing times for writing and reading can be reduced.

What is claimed is:

1. A drive management system comprising:

a memory module having a memory medium for recording predetermined drive data as numerical valves in a state in which said memory module is attached to a vehicle;

reading means for reading out the drive data recorded in said memory module by detaching the memory module from the vehicle; and management data processing means for calculating drive management data such as drive period of time, rest period of time, maximum drive velocity, drive distance, and the like on the basis of the drive data read out of the memory module by said reading means, and for making drive data classified for every driver and/or every vehicle;

and, wherein each of said memory module and said reading means has therein induction coils, and said system further comprises:

power supply means for supplying a power source from the reading means to the memory module by a contactless induction coupling of certain of said induction coils, and data transmitting means for performing a bidirectional transmission to read out the drive data from the memory module to the reading means by a contactless induction coupling of said induction coils.

2. A system according to claim 1, wherein said memory module records numerical valve data of an engine rotational speed and a drive velocity together with time data every predetermined unit time in the state in which the memory module is attached to the vehicle.

3. A system according to claim 1, wherein said management data processing means has drive time calculating means for searching the velocity data of every unit time which is included in the drive data read out of the memory module, for counting the number of velocity data other than the velocity of 0, and thereby for obtaining the drive period of time.

4. A system according to claim 1, wherein said management data processing means has rest time calculating means for searching the velocity data of every unit time which is included in the drive data read out of the memory module, for counting the number of velocity data of the velocity 0, and thereby for obtaining the rest period of time.

5. A system according to claim 1, wherein said management data processing means has rest time calculating means for searching the velocity data of every unit time which is included in the drive data read out of the memory module, and when a predetermined number of velocity data of the velocity 0 continue, for counting the number of said continuous velocity data of the velocity 0, and thereby for obtaining the rest period of time.

6. A system according to claim 1, wherein said management data processing means has drive time calculating means for searching the engine rotational speed and the velocity data of every unit time which are included in the drive data read out of the memory module, for obtaining a ratio between said engine rotational speed and the velocity of said velocity data, for counting the number of velocity data corresponding to the ratio which exceeds a predetermined ratio to obtain the drive period of time, and for determining that said drive period of time is the time when a degree of drive fatigue is high and outputting this drive period of time.

* * * * *